United States Patent
Kreitzer et al.

(10) Patent No.: US 10,570,751 B2
(45) Date of Patent: Feb. 25, 2020

(54) TURBINE ENGINE AIRFOIL ASSEMBLY

(71) Applicant: GENERAL ELECTRIC COMPANY, Schenectady, NY (US)

(72) Inventors: Paul Joseph Kreitzer, West Chester, OH (US); Bradford Alan Tracey, Cold Spring, KY (US); Michael Everitt Isenberg, Cincinatti, OH (US); Thomas Joseph Lipinski, Monroe, OH (US); Scott Alan Schimmels, Miamisburg, OH (US); Kenneth Jay Moore, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 15/820,613

(22) Filed: Nov. 22, 2017

(65) Prior Publication Data

US 2019/0153875 A1 May 23, 2019

(51) Int. Cl.
| | |
|---|---|
| *F01D 5/18* | (2006.01) |
| *F01D 25/12* | (2006.01) |
| *F01D 9/02* | (2006.01) |
| *F02C 3/04* | (2006.01) |
| *F04D 29/58* | (2006.01) |
| *F04D 29/54* | (2006.01) |
| *F02K 3/06* | (2006.01) |
| *F04D 29/32* | (2006.01) |

(52) U.S. Cl.
CPC ............... *F01D 5/189* (2013.01); *F01D 9/02* (2013.01); *F01D 25/12* (2013.01); *F02C 3/04* (2013.01); *F02K 3/06* (2013.01); *F04D 29/324* (2013.01); *F04D 29/542* (2013.01); *F04D 29/582* (2013.01); *F05D 2220/32* (2013.01); *F05D 2240/80* (2013.01); *F05D 2260/201* (2013.01)

(58) Field of Classification Search
CPC .......... F01D 5/184; F01D 5/186; F01D 5/187; F01D 9/02; F01D 25/12; F02C 3/05; F02K 3/06; F04D 29/324; F04D 29/384; F04D 29/388; F05D 2220/32; F05D 2240/80; F05D 2260/201
USPC ...................................................... 416/96 A
See application file for complete search history.

(56) References Cited

U.S. PATENT DOCUMENTS

| | | | |
|---|---|---|---|
| 3,767,322 A | 10/1973 | Durgin et al. | |
| 3,864,058 A | 2/1975 | Womack | |
| 4,063,851 A | 12/1977 | Weldon | |
| 5,533,864 A * | 7/1996 | Nomoto | F01D 5/186 415/115 |
| 5,779,438 A * | 7/1998 | Wilfert | F01D 5/186 415/115 |
| 5,993,156 A * | 11/1999 | Bailly | F01D 5/187 415/115 |
| 6,238,182 B1 * | 5/2001 | Mayer | F01D 5/189 415/115 |

(Continued)

FOREIGN PATENT DOCUMENTS

EP   1126134 A1   8/2001

*Primary Examiner* — Igor Kershteyn
(74) *Attorney, Agent, or Firm* — McGarry Bair PC (57) ABSTRACT

An airfoil assembly for a turbine engine can include an airfoil having an outer wall bounding an interior, and an insert located within the interior with a space between the insert and airfoil outer wall. A cooling hole can pass through the insert with an outlet fluidly coupled to the space between the insert and outer wall.

22 Claims, 7 Drawing Sheets

(56) References Cited

U.S. PATENT DOCUMENTS

| | | |
|---|---|---|
| 6,325,593 B1 | 12/2001 | Darkins, Jr. et al. |
| 6,874,988 B2 * | 4/2005 | Tiemann ................ F01D 5/189 |
| | | 415/115 |
| 6,981,846 B2 | 1/2006 | Liang |
| 7,390,168 B2 | 6/2008 | Liang |
| 7,946,815 B2 | 5/2011 | Liang |
| 8,109,724 B2 * | 2/2012 | Malecki ................ F01D 5/189 |
| | | 416/90 R |
| 8,500,401 B1 | 8/2013 | Liang |
| 9,133,717 B2 | 9/2015 | Nakamata et al. |
| 2009/0185903 A1 * | 7/2009 | Beeck .................... F01D 5/145 |
| | | 416/91 |
| 2015/0226085 A1 * | 8/2015 | Spangler ................ F01D 25/12 |
| | | 60/806 |
| 2016/0201489 A1 * | 7/2016 | Kim ....................... F01D 9/047 |
| | | 415/177 |
| 2016/0222793 A1 | 8/2016 | Snyder et al. |

* cited by examiner

TURBINE ENGINE AIRFOIL ASSEMBLY

STATEMENT REGARDING FEDERALLY SPONSORED RESEARCH OR DEVELOPMENT

This invention was made with government support under Contract No. FA865009D2922 awarded by the United States Government. The United States Government has certain rights in this invention.

BACKGROUND

Turbine engines, and particularly gas or combustion turbine engines, are rotary engines that extract energy from a flow of pressurized combusted gases passing through the engine onto rotating turbine blades.

Turbine engines are often designed to operate at high temperatures to maximize engine efficiency. It is beneficial to provide cooling measures for components such as airfoils in the high-temperature environment, where such cooling measures can reduce material wear on these components and provide for increased structural stability during engine operation.

BRIEF DESCRIPTION

In one aspect, an airfoil assembly for a turbine engine includes an airfoil having an outer wall with an inner surface bounding an interior, the outer wall defining a pressure side and a suction side and extending axially between a leading edge and a trailing edge to define a chord-wise direction, and also extending radially between a root and a tip to define a span-wise direction, an insert located within the airfoil interior and having an outer surface spaced from the airfoil inner surface to define an annular space therebetween, a cooling passage located within the insert, and at least one cooling hole passing through the insert and having an inlet fluidly coupled to the cooling passage and an outlet fluidly coupled to the annular space, the at least one cooling hole being oriented relative to the annular space to cause swirling airflow about the insert and within the annular space.

In another aspect, a turbine engine includes a fan section, compressor section, a combustion section, and a turbine section in axial flow arrangement to define an engine centerline. At least one of the compressor section and turbine section can have an airfoil assembly including an airfoil having an outer wall with an inner surface bounding an interior, the outer wall defining a pressure side and a suction side and extending axially between a leading edge and a trailing edge to define a chord-wise direction, and also extending radially between a root and a tip to define a span-wise direction, an insert located within the airfoil interior and having an outer surface spaced from the airfoil inner surface to define an annular space therebetween, a cooling passage located within the insert, and at least one cooling hole passing through the insert and having an inlet fluidly coupled to the cooling passage and an outlet fluidly coupled to the annular space and oriented relative to the annular space to cause swirling airflow about the insert and within the annular space.

In yet another aspect, a method of cooling an airfoil having an outer wall and an interior insert includes flowing cooling air in a swirling direction around an annular space between the interior insert and the outer wall.

DESCRIPTION OF EMBODIMENTS

The described embodiments of the present disclosure are directed to an airfoil assembly for a turbine engine. For purposes of illustration, the present disclosure will be described with respect to the turbine for an aircraft turbine engine. It will be understood, however, that the disclosure is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
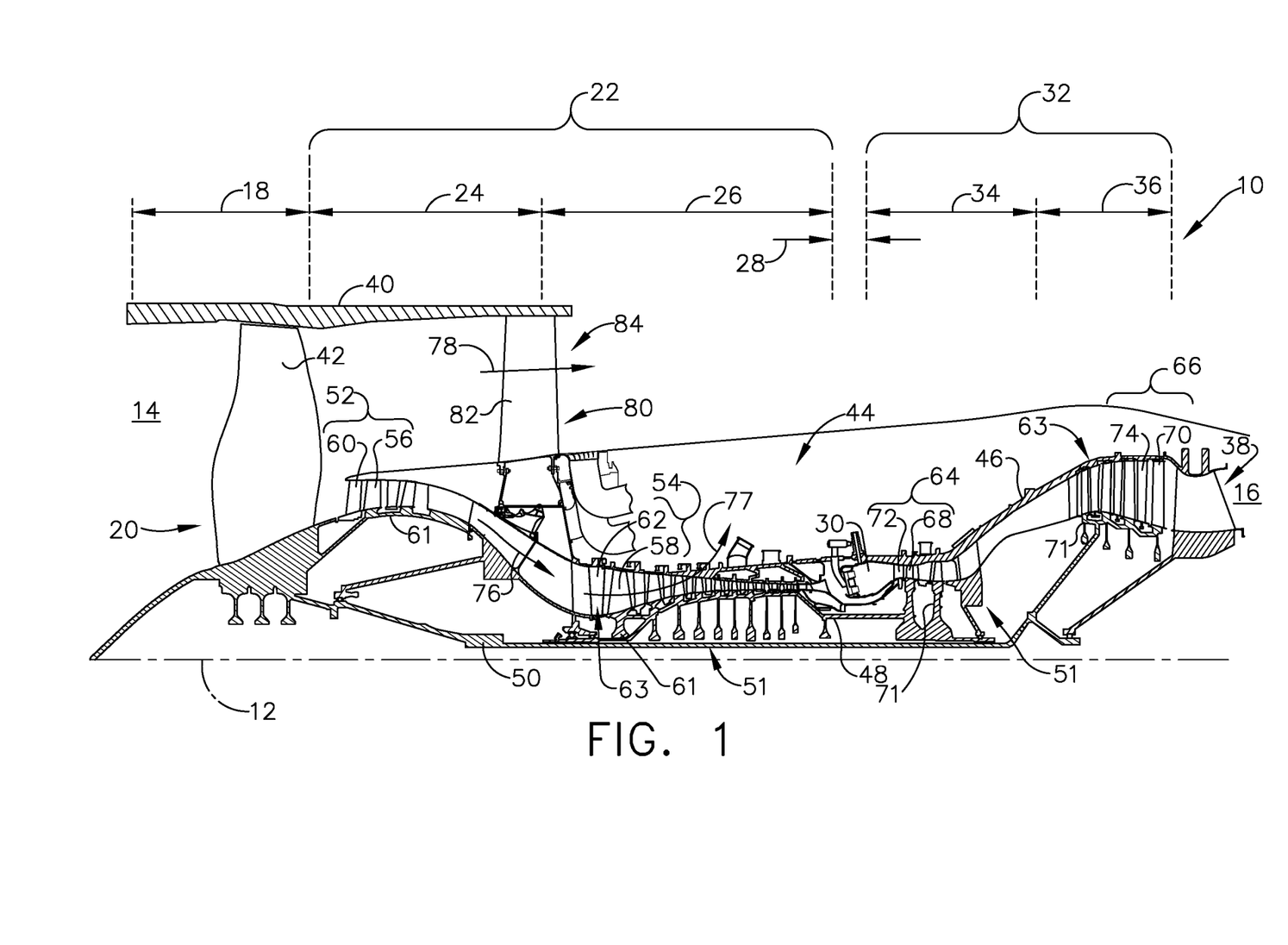
FIG. 1 is a schematic cross-sectional diagram of a turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
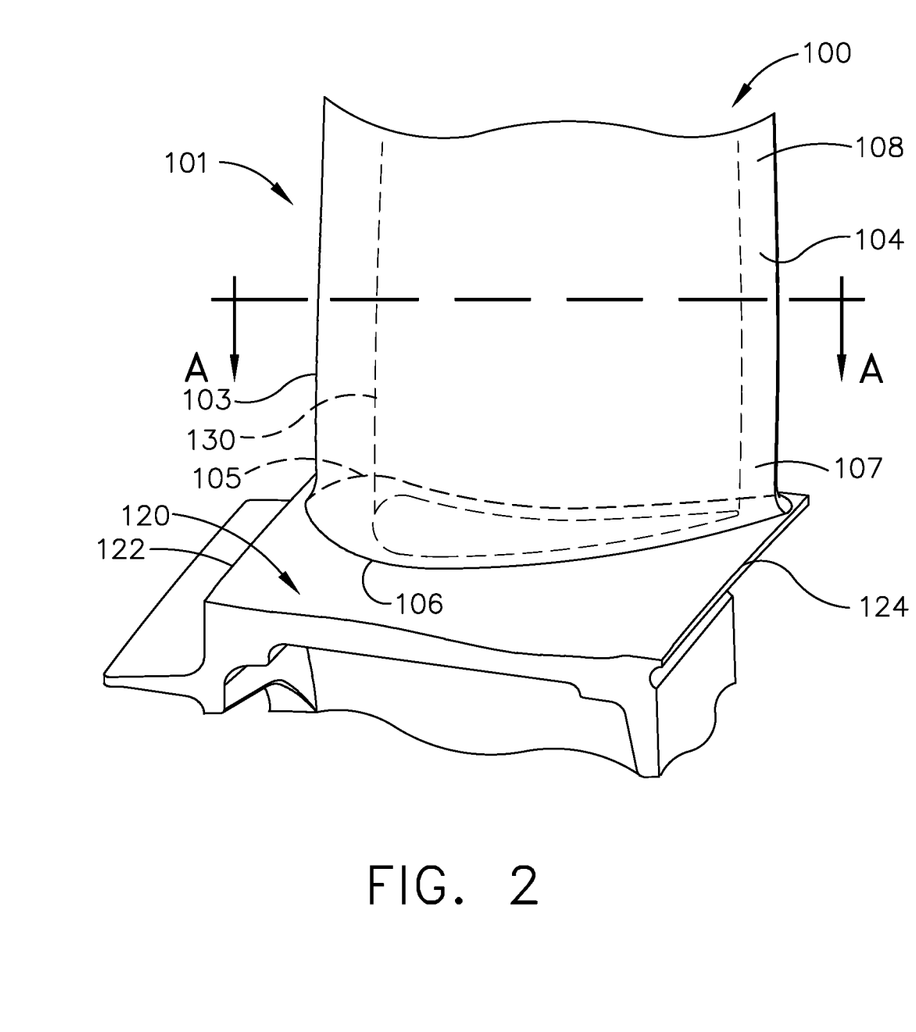
FIG. 2 is a perspective view of an airfoil assembly in the turbine engine of FIG. 1 according to various aspects described herein.

Referring now to FIG. 2, an airfoil assembly 100 is illustrated which can be utilized in the turbine engine 10. The airfoil assembly 100 includes an airfoil 101 having an outer wall 102 extending between a leading edge 103 and trailing edge 104, defining a chord-wise direction, and also extending between a pressure side 105 and a suction side 106. The airfoil 101 can also extend from a root 107 to a tip 108, defining a span-wise direction. In the example of FIG. 2 the airfoil 101 is illustrated as extending from a platform 120 having a fore edge 122 and aft edge 124 as shown, with the root 107 proximate the platform 120. In addition, an insert 130 can be positioned within the airfoil 101. In one non-limiting example the insert 130 can include a strut to provide for structural stability, effective transfer of forces or stresses, or transfer of fluids to or from the turbine engine 10 during operation. In other non-limiting examples, the insert 130 can have no structural component, or the insert 130 may be integrally formed within the airfoil 101, including being coupled to the airfoil 101 at the root 107 or within the platform 120.

It will be understood that the airfoil 101 can be any rotating or non-rotating airfoil within the turbine engine 10, including in the compressor section 22 or turbine section 32. In one non-limiting example the airfoil 101 can be a vane, such as the HP turbine vane 72, and extending between an inner band and an outer band. In such an example, the platform 120 can be either of the inner band or outer band. In another non-limiting example the airfoil 101 can be a blade, such as the HP turbine blade 68, which can be mounted to a dovetail that includes the platform 120. In still another non-limiting example, the airfoil 101 can be part of a frame within the engine, such as a turbine center frame or turbine rear frame, in which case the airfoil 101 may be mounted directly to the frame.

Figure 3:
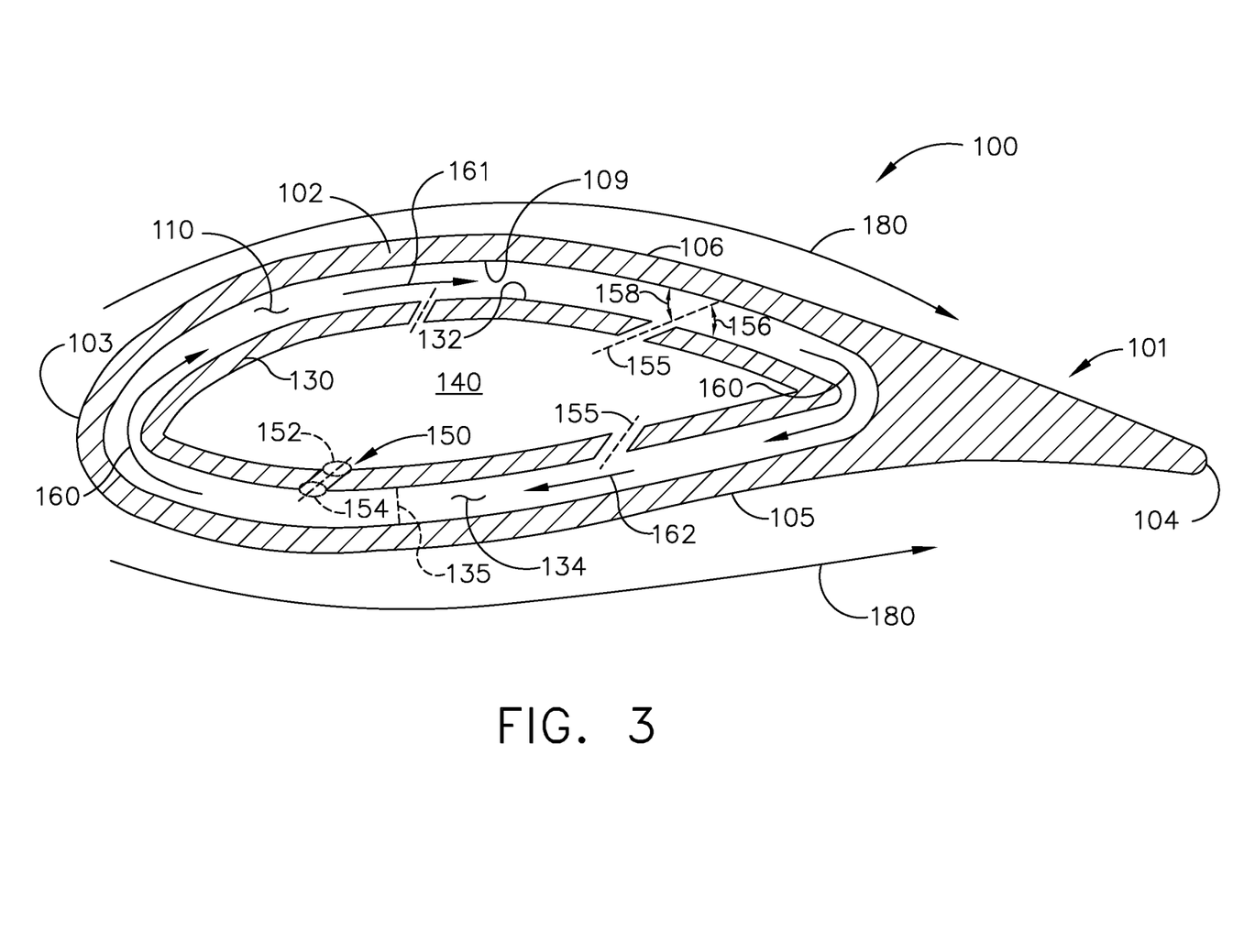
FIG. 3 is a cross-sectional view of the airfoil assembly of FIG. 2 along the line A-A according to a first embodiment.

Turning to FIG. 3, a cross-sectional view of the airfoil assembly 100 is illustrated. The outer wall 102 of the airfoil 101 can include an inner surface 109 bounding an interior 110 of the airfoil 101. The insert 130 can include an outer surface 132 spaced by a gap length 133 from the inner surface 109 of the airfoil outer wall 102 such that an annular space 134 is defined between the insert outer surface 132 and airfoil inner surface 109. The gap length 133 is illustrated in a non-limiting example as being larger near the leading edge 103 and trailing edge 104 and smaller along the pressure and suction sides 105, 106. The gap length 133 can also be a constant size between the outer surface 132 and inner surface 109, or can be varied to customize the annular space 134 as desired.

An interior cooling passage 140 can also be provided within the airfoil 101, and the insert 130 can surround the interior cooling passage 140 as shown. The interior cooling passage 140 can be fluidly coupled to any other cooling passage within the airfoil assembly 101 as desired, including a cooling passage within the platform (not illustrated).

The insert 130 can include at least one cooling hole 150 with an inlet 152 fluidly coupled to the interior cooling passage 140 and an outlet 154 fluidly coupled to the annular space 134. The cooling hole 150 can also define a centerline 155, where the centerline 155 can form a first angle 156 with the airfoil inner surface 109 and a second angle 158 with the insert outer surface 132. It is contemplated that the cooling hole 150 can be formed such that either or both of the first angle 156 and second angle 158 can be non-orthogonal; in one non-limiting example, the first or second angles 156, 158 can be formed smaller than 10 degrees. Furthermore, multiple cooling holes 150 can be formed through the insert 130 with inlets 152 fluidly coupled to the interior cooling passage 140 and outlets 154 fluidly coupled to the annular space 134; it will be understood that any number or arrangement of cooling holes 150 are contemplated for use in the airfoil assembly 100.

It is further contemplated in another example that the airfoil interior 110 can be sealed (not illustrated) at the root 107 or tip 108, thereby preventing flow migration between the airfoil 101 and platform 120.

In operation, cooling air originating in the fan stream, booster, or compressor can flow from the interior cooling passage 140 into the annular space 134 by way of the cooling hole 150. The non-orthogonal first angle 156 or second angle 158 can cause a swirling airflow 160 to be generated in the annular space 134, illustrated in a clockwise direction as shown in the example of FIG. 3. It can be appreciated that as the first or second angles 156, 158 approach 90 degrees, air flowing through the cooling holes 150 can impinge the inner surface 109 and stagnate with little circulation about the annular space 134; the use of smaller first or second angles 156, 158 can direct cooling air into the swirling airflow 160 which circulates about the annular space 134. Local airflows external to the airfoil 101 are illustrated with arrows 180 moving generally left to right; it can be appreciated that a first portion 161 of the swirling airflow 160 adjacent the suction side 106 can be aligned with the local airflow direction 180, while a second portion 162 of the airflow 160 adjacent the pressure side 105 can be anti-aligned with the local airflow direction 180.

It can be appreciated that even the use of a single cooling hole 150 with non-orthogonal first or second angles 156, 158 can be sufficient to generate the swirling airflow 160 around the annular space 134. Multiple cooling holes 150 can also be utilized to enhance or support the swirling airflow 160; it can be appreciated that adjacent cooling holes 150 can have differing first angles 156, or differing second angles 158, to selectively aid or direct portions of the swirling airflow 160 as desired.

Figure 4:
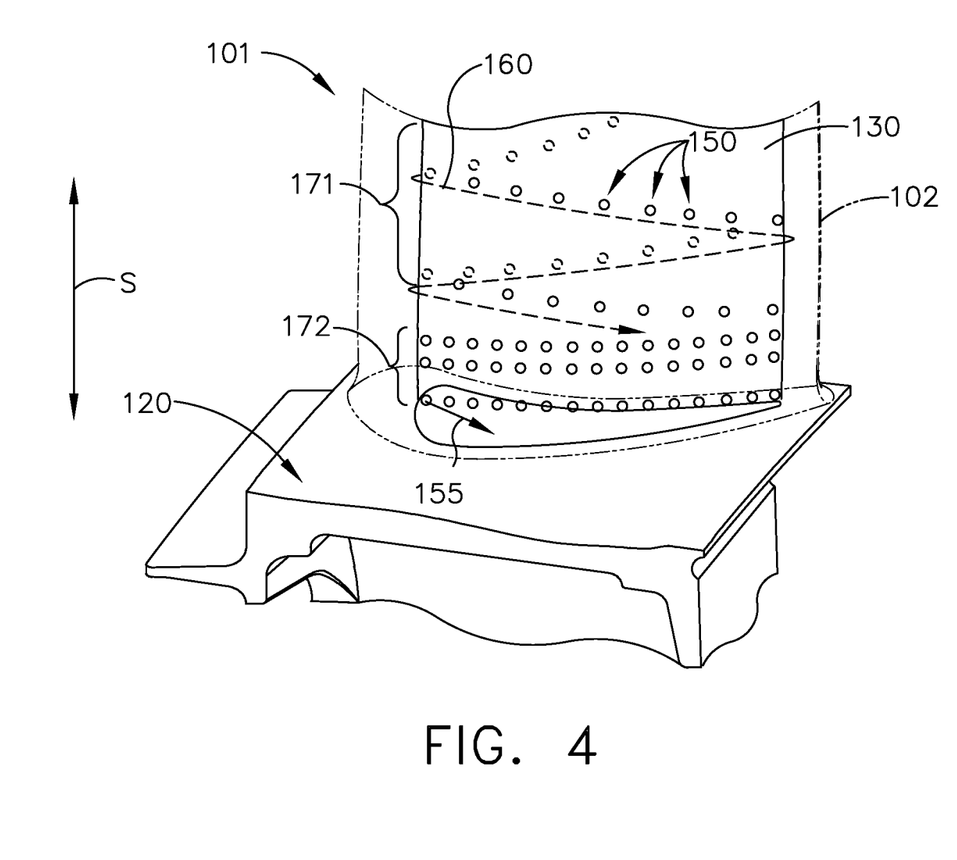
FIG. 4 illustrates an insert which can be utilized in the airfoil assembly of FIG. 2.

FIG. 4 illustrates non-limiting examples of cooling holes 150 that can be positioned on the insert 130, where the airfoil 101 is illustrated in phantom. In one example, a first region 171 includes a plurality of cooling holes 150 arranged in a spiral about the insert 130 as shown, where the swirling airflow 160 can be directed along the span-wise direction (indicated by the letter S) while flowing around the annular space 134. In another example, a second region 172 includes a plurality of cooling holes 150 arranged in rows spaced apart in the span-wise direction as shown, where the swirling airflow 160 can flow around the annular space 134 with no span-wise component to the flow. The rows can extend annularly about the entire insert 130 or be positioned on a portion of the insert 130 as desired. It is also contemplated that at least one cooling hole 150 can have its centerline 155 directed toward the platform 120 as shown such that cooling air can impinge the platform 120 in the annular space 134; in this manner, the swirling airflow 160 can provide thermal cooling for the platform 120 or any desired portion of the airfoil 101.

Figure 5:
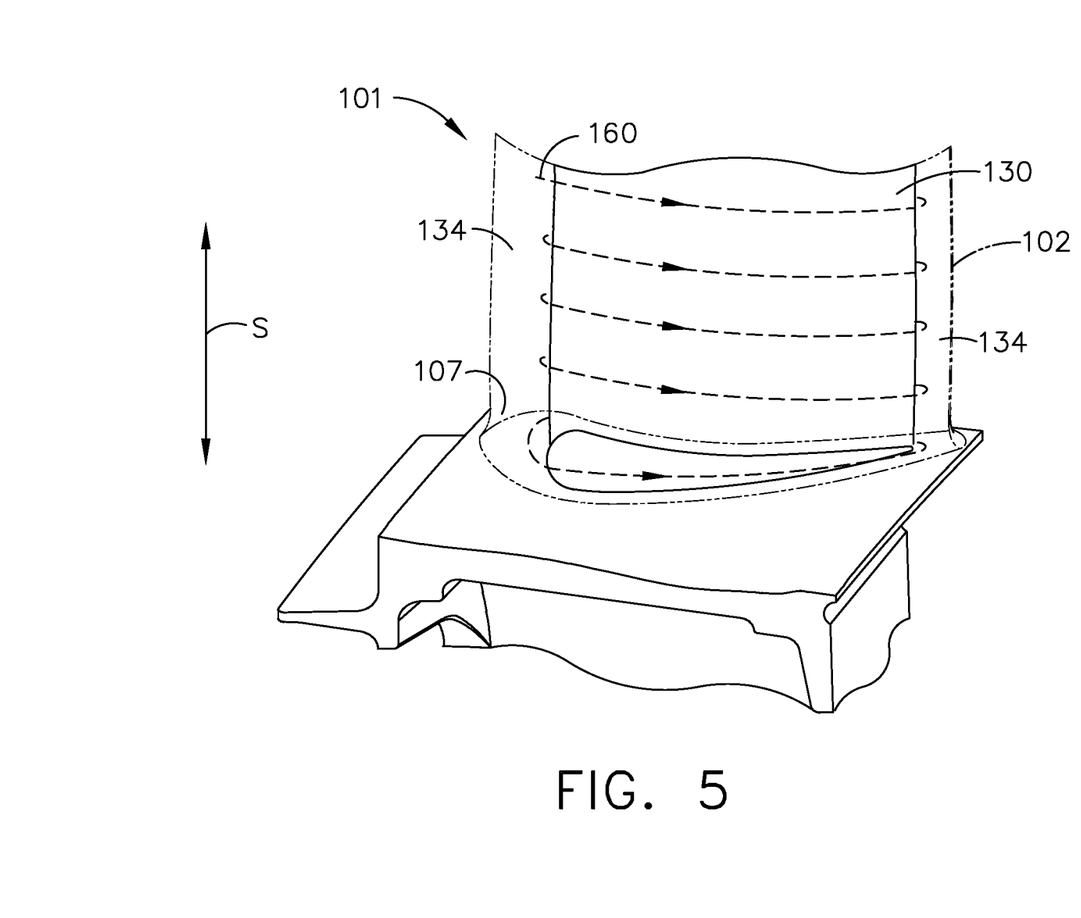
FIG. 5 illustrates a swirling airflow in the airfoil assembly of FIG. 2.

FIG. 5 illustrates one non-limiting example of the swirling airflow 160 about the insert 130. It can be appreciated that the cooling holes 150 (FIG. 4) can be positioned in one example, such as those in the first region 171, such that the swirling airflow 160 forms a span-wise vortex in the annular space 134, moving cooling air in the span-wise direction S toward the root 107 of the airfoil 101 as shown. Alternately, it can be appreciated that the cooling holes 150 (FIG. 4) can be utilized to direct the swirling airflow 160 toward the tip 108 of the airfoil 101 as well.

Figure 6:
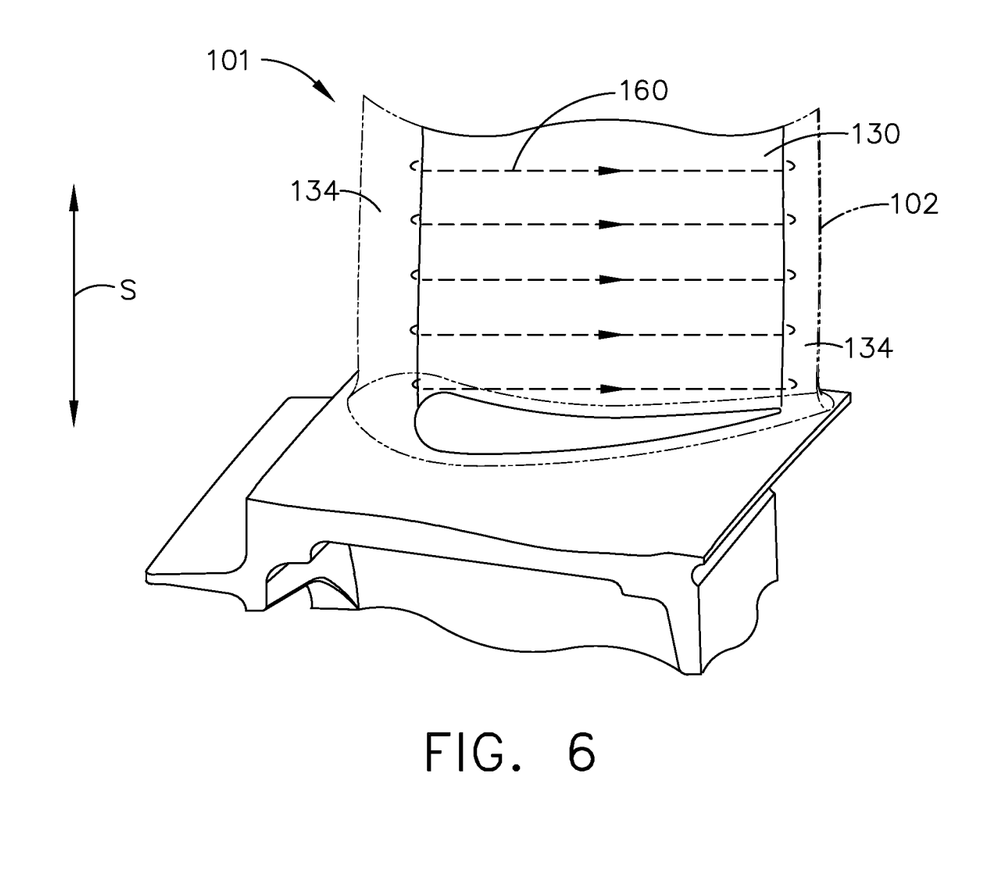
FIG. 6 illustrates a swirling airflow in the airfoil assembly of FIG. 2.

FIG. 6 illustrates another non-limiting example of the swirling airflow 160 about the insert 130. The cooling holes 150 (FIG. 4), such as those in the second region 172, can be arranged to generate the swirling airflow 160 within the annular space 134 with little to no air movement in the span-wise direction S, in effect generating a continuous rotating column of air within the annular space 134. It can be appreciated that other cooling hole arrangements can provide a mixture of swirling airflows 160 within the annular space 134, including unequal numbers of cooling holes 150 adjacent the pressure side 105 and suction side 106 (FIG. 3).

It will be understood that other airflows, or combinations of airflows, may be utilized in the airfoil 101, including airflows in a purely span-wise direction S (not shown) mixing with swirling airflows 160. Furthermore, other features or structures may be utilized within the airfoil 101 to aid in maintaining or directing the swirling airflows 160, including surface features such as ridges, textured regions, or protuberances along the airfoil inner surface 109 or outer surface 132 of the insert 130 as desired.

Figure 7:
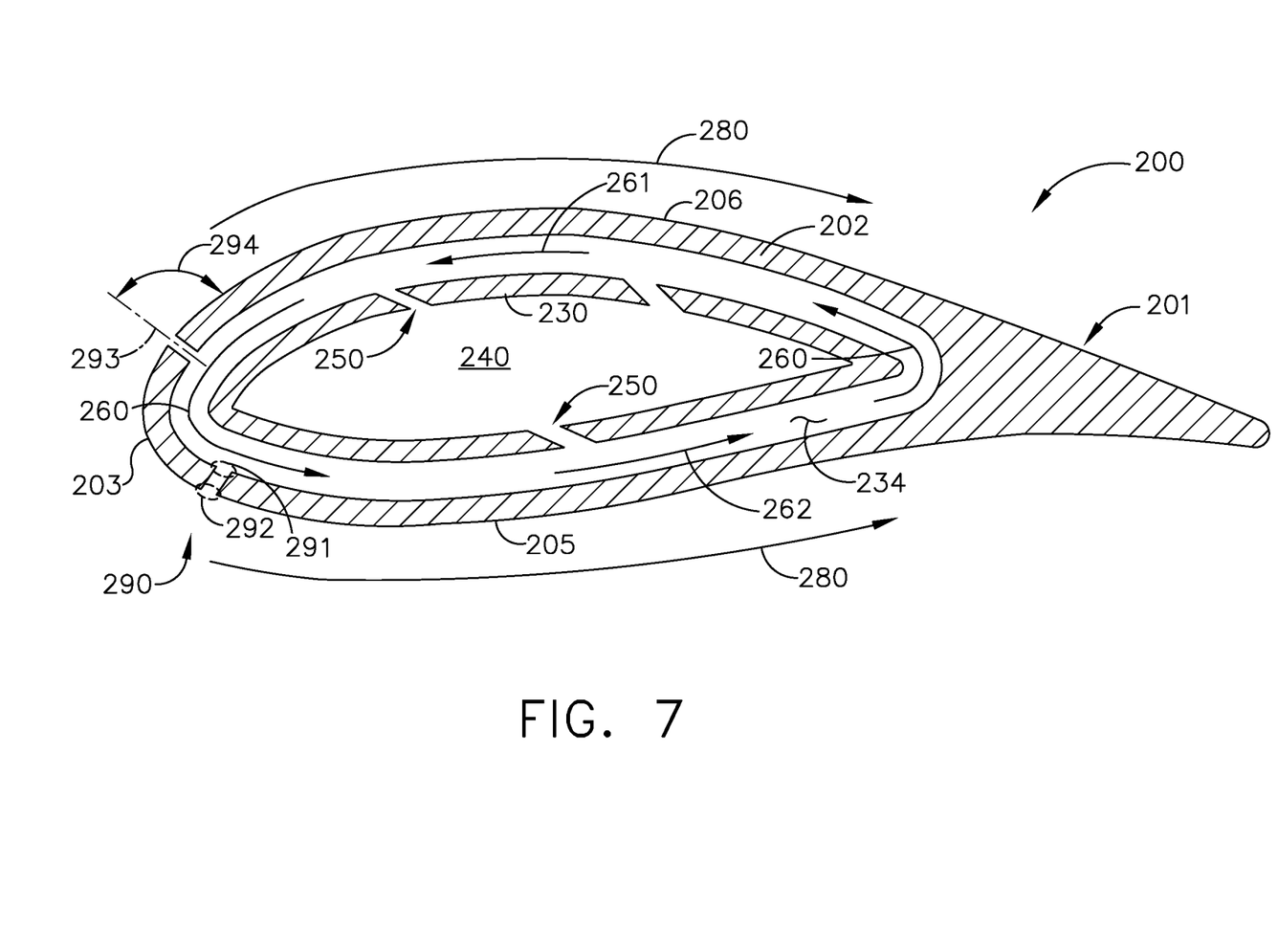
FIG. 7 is an alternative cross-sectional view of FIG. 3 according to a second embodiment.

Turning to FIG. 7, another airfoil assembly 200 is illustrated which can be utilized in the turbine engine 10 of FIG. 1. The airfoil assembly 200 is similar to the airfoil assembly 100; therefore, like parts will be identified with like numerals increased by 100, with it being understood that the description of the like parts of the airfoil assembly 100 applies to the airfoil assembly 200, unless otherwise noted.

The airfoil assembly 200 includes an airfoil 201 having an outer wall 202 extending between a leading edge 203 and trailing edge 204 and also extending between a pressure side 205 and a suction side 206. An insert 230 can surround an interior cooling passage 240 within the airfoil 201, and an annular space 234 can be formed between the insert 230 and outer wall 202. At least one cooling hole 250 through the insert 230 can generate a swirling airflow 260 around the annular space 234 in a counterclockwise fashion as shown. At least one airfoil cooling hole 290 can be formed anywhere in the outer wall 202 as desired, including near or along a leading edge 203 or trailing edge 204 of the airfoil 201, or along a portion of the pressure side 205 or suction side 206. In this manner, cooling air from the interior cooling passage 240 can be supplied to any interior or exterior portion of the airfoil outer wall 202.

The example of FIG. 7 illustrates that a first portion 261 of the swirling airflow 260 adjacent the suction side 206 can be anti-aligned with an external local airflow direction 280, while a second portion 262 of the airflow 260 adjacent the pressure side 205 can be aligned with the local airflow direction 280 external to the airfoil 201 as shown.

In addition, a plurality of airfoil cooling holes 290 can be formed anywhere in the outer wall 202, and are illustrated near the leading edge 203. The airfoil cooling hole 390 can include an airfoil cooling inlet 291 on an inner surface 209 of the outer wall 202, fluidly coupled to the annular space 234, as well as an airfoil cooling outlet 292 formed on the exterior surface of the outer wall 202 and fluidly coupled to the airfoil exterior. The airfoil cooling hole 290 can further define an airfoil cooling centerline 293 which can form an angle 294 with the outer wall 202. It is contemplated that the angle 294 can be orthogonal to direct cooling air to the airfoil exterior; in another non-limiting example, the angle 294 can be non-orthogonal, including smaller than 10 degrees, in order to direct cooling air from the annular space 234 along the pressure or suction side 205, 206. Furthermore, the airfoil cooling centerline 293 can also form an orthogonal or non-orthogonal angle (not shown) with the insert outer surface Aspects of the present disclosure provide for a method of cooling an airfoil by flowing cooling air from the interior cooling passage (FIG. 3) around the annular space between the interior insert and outer wall (FIGS. 2, 3) in a vortical or swirling direction by way of the cooling passages having non-orthogonal angles with the airfoil wall inner surface or insert outer surface (FIG. 3). It can be appreciated that as the cooling air swirls about the insert within the annular space, a vortex or vortical airflow can be formed with span-wise motion of the airflows, or a column of rotating air can also be formed within the annular space with little to no span-wise motion of the airflows (FIGS. 4, 5, 6). The swirling airflow can be directed onto the platform through the cooling holes (FIG. 4), and also to the airfoil exterior by way of airfoil cooling holes in the airfoil outer wall (FIG. 7).

It can be appreciated that the number and arrangement of cooling holes along the insert can provide for a robust cooling design allowing for adjustment of the resultant flow-field within the airfoil, and that the cooling design can be adjusted to work with varying airfoil geometry designs. Aspects of the disclosure are also compatible with airfoil insert and fairing designs, and have wide applicability to various engine components and platforms. In addition, the vortex airflow can provide a fully mixed or uniform airflow in the annular space which improves cooling ability of the engine component in operation.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil assembly for a turbine engine comprising:
   an airfoil having an outer wall with an inner surface bounding an interior, the outer wall defining a pressure side and a suction side and extending axially between a leading edge and a trailing edge to define a chord-wise direction, and also extending radially between a root and a tip to define a span-wise direction;
   an insert located within the airfoil interior and having an outer surface spaced from the airfoil inner surface to define an annular space therebetween;
   a cooling passage located within the insert; and
   at least one cooling hole passing through the insert and having an inlet fluidly coupled to the cooling passage and an outlet fluidly coupled to the annular space, the at least one cooling hole being oriented relative to the annular space to cause a swirling airflow about the insert and within the annular space, with a first portion of the swirling airflow being anti-aligned with a local flow direction external to the airfoil, and a second portion of the swirling airflow being aligned with the local flow direction.

2. The airfoil assembly of claim 1 wherein the at least one cooling hole defines a centerline that forms a non-orthogonal angle with at least one of the inner surface and outer surface.

3. The airfoil assembly of claim 2 wherein the centerline forms a non-orthogonal angle with both the inner surface and the outer surface.

4. The airfoil assembly of claim 1 further comprising a plurality of cooling holes arranged about the insert in span-wise spaced rows.

5. The airfoil assembly of claim 1 further comprising a plurality of cooling holes arranged about the insert in a spiral arrangement in a span-wise direction.

6. The airfoil assembly of claim 1 further comprising an airfoil cooling hole passing through the outer wall with an airfoil cooling inlet fluidly coupled to the annular space and an airfoil cooling outlet fluidly coupled to the airfoil exterior.

7. The airfoil assembly of claim 6 wherein the airfoil cooling hole defines a cooling centerline that forms a non-orthogonal angle with at least one of the inner surface and outer surface.

8. The airfoil assembly of claim 7 wherein the cooling centerline forms a non-orthogonal angle with both the inner surface and the outer surface.

9. The airfoil assembly of claim 1 further comprising a platform, wherein the airfoil extends from the platform.

10. The airfoil assembly of claim 9 wherein the cooling hole defines a centerline that is directed toward the platform.

11. A turbine engine comprising a fan section, compressor section, a combustion section, and a turbine section in axial flow arrangement to define an engine centerline, with at least one of the compressor section and turbine section having an airfoil assembly comprising:
  an airfoil having an outer wall with an inner surface bounding an interior, the outer wall defining a pressure side and a suction side and extending axially between a leading edge and a trailing edge to define a chord-wise direction, and also extending radially between a root and a tip to define a span-wise direction;
  an insert located within the airfoil interior and having an outer surface spaced from the airfoil inner surface to define an annular space therebetween;
  a cooling passage located within the insert; and
  at least one cooling hole passing through the insert and having an inlet fluidly coupled to the cooling passage and an outlet fluidly coupled to the annular space and oriented relative to the annular space to cause a swirling airflow about the insert and within the annular space, with a first portion of the swirling airflow being anti-aligned with a local flow direction external to the airfoil, and a second portion of the swirling airflow being aligned with the local flow direction.

12. The turbine engine of claim 11 wherein the at least one cooling hole defines a centerline that forms a non-orthogonal angle with at least one of the inner surface and outer surface.

13. The turbine engine of claim 11 further comprising an airfoil cooling hole passing through the outer wall with an airfoil cooling inlet fluidly coupled to the annular space and an airfoil cooling outlet fluidly coupled to the airfoil exterior.

14. The turbine engine of claim 13 wherein the airfoil cooling hole defines an airfoil cooling centerline that forms a non-orthogonal angle with at least one of the inner surface and outer surface.

15. The turbine engine of claim 11 further comprising multiple cooling holes arranged about the insert in span-wise spaced rows.

16. The turbine engine of claim 11 further comprising multiple cooling holes arranged about the insert in a spiral arrangement in the span-wise direction.

17. The turbine engine of claim 12 further comprising a platform having spaced first and second surfaces, wherein the airfoil extends from the first surface.

18. The turbine engine of claim 17 wherein the centerline is directed toward the platform.

19. A method of cooling an airfoil having an outer wall and an interior insert, the method comprising:
  flowing cooling air in a first direction around an annular space between the interior insert and the outer wall, with the first direction being anti-aligned with a local airflow external to the airfoil; and
  flowing the cooling air in a second direction around the annular space, with the second direction being aligned with the local airflow external to the airfoil.

20. The method of claim 19 further comprising flowing cooling air from the annular space through an airfoil cooling hole in the outer wall to the exterior of the airfoil.

21. The method of claim 20 further comprising flowing cooling air from an interior of the insert to the annular space through a cooling hole in the insert.

22. The method of claim 21 further comprising flowing cooling air through the cooling hole so that it contacts the airfoil at a non-orthogonal angle.

* * * * *